3,099,779
REMOTE CONTROL OF WARD LEONARD DRIVE BY GENERATOR SPEED VARIATION
Arnold Hallsworth, Sunderland, England, assignor to Steels Engineering Products Limited, Sunderland, England
Filed June 3, 1960, Ser. No. 33,762
Claims priority, application Great Britain June 5, 1959
1 Claim. (Cl. 318—157)

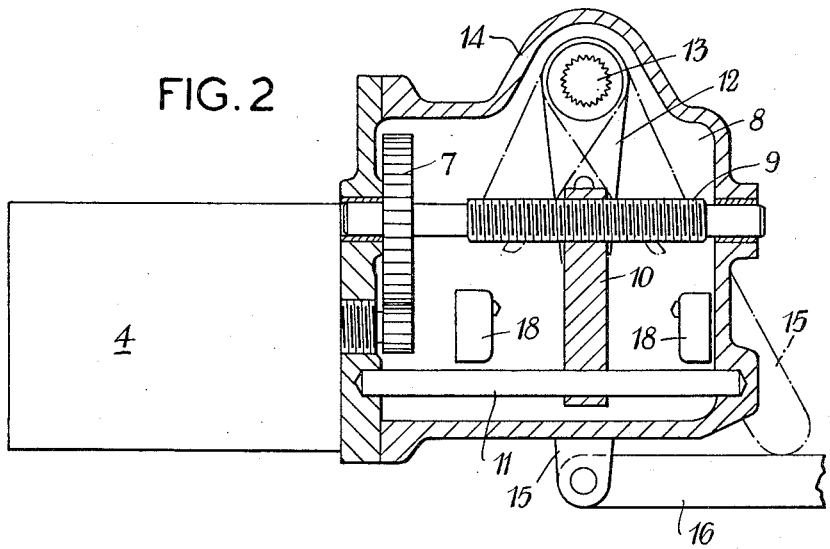
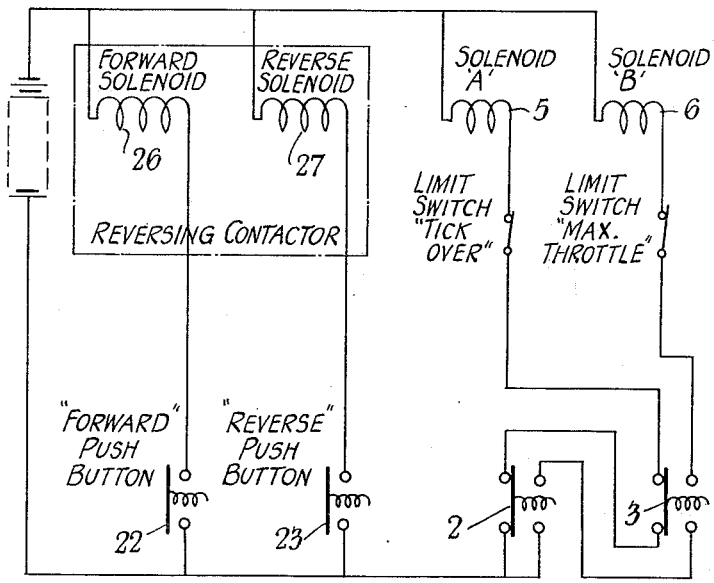

The present invention relates broadly to the remote control of an electric motor and is more particularly though not exclusively concerned with controlling motions such as for example those of a crane which are driven by a variable multiple supply from an engine generator or motor generator.

A further object of the present invention is to provide an automatic safety factor whereby should the operator lose contact with the control, motion is automatically stopped.

According to the present invention the operation (including the direction of rotation) of an electric motor is controlled by a pair of switches in circuit with a pair of solenoid or like controlled contactors so that with the switches in one relative position the circuit is completed through one contactor to rotate the motor in one direction, with the switches in a second relative position a circuit through a second contactor is completed to rotate the motor in the opposite direction and with the switches in a third relative position in which one switch is in each circuit the electricity supply to the motor is broken.

The motor can be used to drive or actuate a controller for example a worm driving a rocking shaft from which controls can be led, limiting switches being positioned at each end of the desired amount of angular movement of the shaft to cut the motor circuit.

In one particular application of the invention it is used to operate a remote control of motion of a crane which is driven by a variable voltage supply from an engine generator and in such an application the rocking shaft is linked to the throttle of the engine i.e. to control the fuel mixture entering the inlet manifold of the engine. The engine is coupled to a shunt wound generator which in turn drives a motor of predominately series characteristics through a reversing contactor.

The invention will now be described with reference to the accompanying drawings in which:

FIGURE 2 shows partly in section details of the actuator and

FIGURE 3 shows the wiring circuit for controlling the mechanism.

Figure 1:
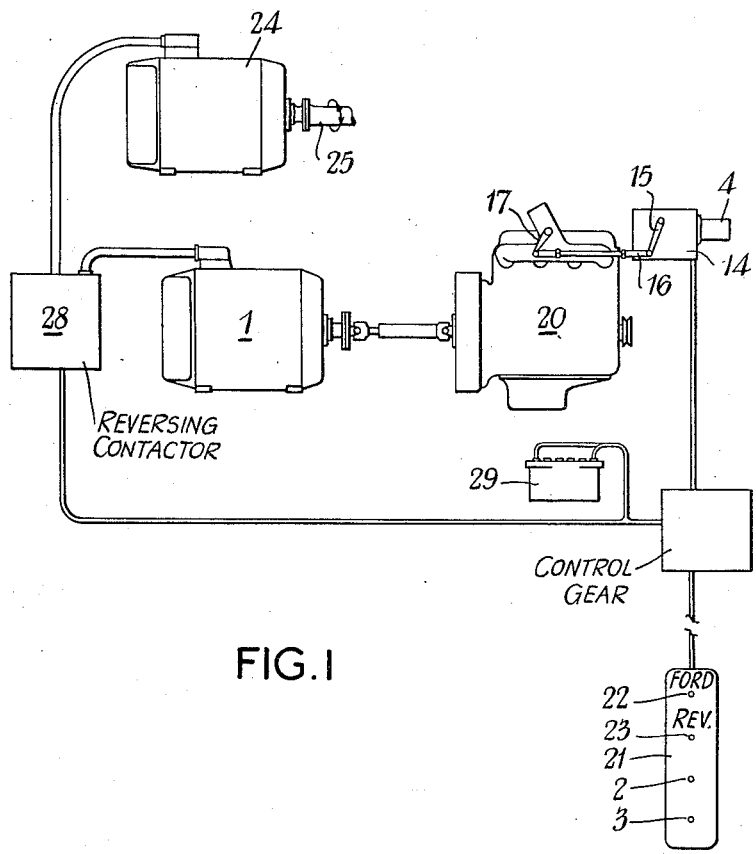
FIGURE 1 shows diagrammatically one layout in accordance with the present invention suitable for controlling the speed of the driving shaft to a crane.

In the arrangement shown in the drawings the control of the out-put of a generator 1 driven by a prime mover 20 that may be an I.C. engine is by a pair of spring loaded speed control buttons 2 and 3 which when in the unpressed or released position close a circuit to a D.C. actuator motor 4 by means of a solenoid contactor 5 to drive the motor 4 in one direction and which when in the pressed down position close a second circuit to a second solenoid actuated contactor 6 to rotate the motor 4 in the opposite direction and further when either button 2 or 3 is in the pushed down position and the other is in a released position both circuits are open so as to release both solenoid actuated contactors to cut the current to the motor and bring it to a halt.

The actuator motor 4 is connected by suitable gearing 7 to a controller 8 comprising a rotatably mounted worm or drive screw 9 which is in driving connection with a slide member 10 mounted upon a guide bar 11 and connected by a slot and pin to an arm 12 keyed to a rocking shaft 13 journaled in the housing 14. The rocking shaft 13 carries an operating lever 15 which is connected by link 16 to the throttle 17 of the engine. Rotation of the drive screw 9 in one direction serves to rock the lever 15 and to move the throttle to the closed position and movement in the opposite direction serves to open the throttle. Conveniently limit switches 18 are mounted at each end of the drive screw 9 to be operated by the slide member 10 to cut the current to the motor when the slide member reaches either end of its motion.

Conveniently the control panel 21 housing the speed control buttons can also house a pair of buttons 22, 23 or a toggle switch controlling the direction of the series motor 24 driving the crane through the output shaft 25.

The buttons 22 and 23 operate forward and reversing solenoids 26 and 27 respectively which are housed in a reversing contactor casing 28, and which is conveniently located with respect to the generator 1 and the motor 24.

In operation the engine speed is increased by pressing both speed control buttons 2 and 3. The operation of pressing the buttons serves to complete the circuit through the solenoid 6 to operate the motor 4 in that direction which moves the rocking shaft to open the throttle. To decrease the engine speed both buttons 2 and 3 are released which operation serves to complete the circuit to the solenoid actuated contactor 5 to rotate the actuated motor 4 in the opposite direction for the actuating lever 15 to close the throttle. To hold the engine speed one button is kept pressed and the other released which serves to break both circuits and to stop the electric motor, and so to hold the throttle at that position until the other button is pressed and released to open and close the throttle as desired.

By varying the engine speed the voltage output of the generator 1 is controlled and so the speed of the series motor 24 to control the speed of the output shaft 25 and of the crane operation. Voltage can be varied continuously over a range from zero to the maximum available from the generator 1, with consequential control over the speed of the output shaft 25.

If for any reason the operator becomes incapable of control and releases both buttons the circuit is completed for closing the throttle which brings the crane to a standstill.

The current for operating the switch gear and the actuator motor 4 may be derived from a battery 29 which may be a 12 volt type and may if desired be maintained by a charging dynamo driven by engine 1 or the current may be derived from any other convenient source e.g. from the battery of the vehicle if the equipment is mounted upon a vehicle employing a battery. Further by controlling the power output in this manner the control panel 21 may be at the end of a trailing cable permitting remote control of the mechanism being operated.

Whilst the invention has been described with particular reference to controlling the motions of cranes the circuit and the control of the present invention can be used for controlling other motions or speeds.

In some cases where the deadman feature is not desired, the dual push-buttons 2 and 3 may be wired so that increase of speed is obtained by pressing one button, reduction by pressing the other, and when none is selected the speed of motion will remain constant.

Among other advantages the following advantages are obtained by using the drive and drive control the subject of this invention:

(1) Simple, cheap and completely instinctive control by operator.

(2) Infinitely variable speed from zero to the maximum available.

(3) "Dead-man" type of safety operation can be used if desired.

(4) Delicate control irrespective of load.

(5) By suitable design of the electrical equipment ideal torque conversion is possible.

I claim:

Means for driving and controlling the speed of an output shaft comprising a mainly series wound compound motor in driving connection with the shaft, a variable speed shunt wound generator for supplying power to the compound wound motor, a reversing contactor interposed between the generator and the motor, a prime mover for operating the generator, a control member connected to the speed control of the prime mover, a reversible electric motor operatively connected to the control member, a pair of contactors each controlling the directional supply of current to the reversible electric motor, solenoids operating said contactors, control switches operating the solenoids so that the directional supply of current is controlled to the reversible motors or the current supply is cut off, and in which said switches are so arranged and loaded that when left they automatically close the circuit to the reversible electric motor to effect movement of the prime mover speed control to the minimum position.

References Cited in the file of this patent

UNITED STATES PATENTS

| | | |
|---|---|---|
| 1,787,987 | Livingston | Jan. 6, 1931 |
| 1,896,169 | Godsey | Feb. 7, 1933 |
| 2,060,900 | Simmen | Nov. 17, 1936 |
| 2,397,226 | Weybrew | Mar. 26, 1946 |
| 2,500,753 | Higgs | Mar. 14, 1950 |
| 2,680,818 | Ringwald | June 8, 1954 |